(12) United States Patent
Saito

(10) Patent No.: US 8,999,155 B2
(45) Date of Patent: Apr. 7, 2015

(54) FILTRATION MEDIA CLEANING APPARATUS

(75) Inventor: Yasuhiro Saito, Komae (JP)

(73) Assignee: Nihon Genryo Co., Ltd., Kanagawa (JP)

( * ) Notice: Subject to any disclaimer, the term of this patent is extended or adjusted under 35 U.S.C. 154(b) by 412 days.

(21) Appl. No.: 13/381,832

(22) PCT Filed: Jun. 30, 2010

(86) PCT No.: PCT/JP2010/004308
§ 371 (c)(1),
(2), (4) Date: Dec. 30, 2011

(87) PCT Pub. No.: WO2011/001674
PCT Pub. Date: Jan. 6, 2011

(65) Prior Publication Data
US 2012/0292245 A1 Nov. 22, 2012

(30) Foreign Application Priority Data

Jul. 2, 2009 (JP) ................................ 2009-157551
Jun. 15, 2010 (JP) ................................ 2010-136283

(51) Int. Cl.
*B01D 24/00* (2006.01)
*B01D 41/02* (2006.01)
(Continued)

(52) U.S. Cl.
CPC .............. *B01D 24/14* (2013.01); *B01D 24/407* (2013.01); *B01D 24/4636* (2013.01); *B01D 24/4689* (2013.01); *B03B 5/00* (2013.01); *B01D 41/02* (2013.01)

(58) Field of Classification Search
CPC .. B01D 24/14; B01D 24/407; B01D 24/4631; B01D 24/4636; B01D 24/4689; B01D 41/02; B03B 5/00

USPC ................. 210/189, 269, 270, 275; 134/132; 415/71–75; 198/671; 366/318, 319
See application file for complete search history.

(56) References Cited

U.S. PATENT DOCUMENTS 268,606 A * 12/1882 Barbour ........................ 384/369
1,683,010 A * 9/1928 Anderson ....................... 415/72
(Continued)

FOREIGN PATENT DOCUMENTS

| JP | 53027975 A | 3/1978 |
| JP | 54031333 U | 3/1979 |

(Continued)

OTHER PUBLICATIONS

Chinese Office Action of Sep. 10, 2013 in the corresponding Chinese Patent Application No. 201080029110.0.
(Continued)

*Primary Examiner* — Matthew O Savage
(74) *Attorney, Agent, or Firm* — Lucas & Mercanti, LLP

(57) ABSTRACT

The cleansing apparatus is equipped with: an upright outer cylinder and a screw conveyor is rotatably provided within the outer cylinder. The screw conveyor conveys filtration media introduced through an inlet at the lower end of the outer cylinder upward to an outlet at the upper end of the outer cylinder. A drive section rotationally drives the screw conveyor. A control section controls the rotation of the drive section. A regulating blade regulates the upward movement of the filtration media is above the outlet and is coaxially with the screw conveyor. A cleansing liquid is introduced through an aperture above the regulating blade within the outer cylinder.

9 Claims, 11 Drawing Sheets

(51) Int. Cl.
*B01D 24/14* (2006.01)
*B01D 24/40* (2006.01)
*B01D 24/46* (2006.01)
*B03B 5/00* (2006.01)

(56) References Cited

U.S. PATENT DOCUMENTS 2,877,710 A * 3/1959 Barnhart .......................... 415/74
8,695,613 B2 * 4/2014 Saito ............................. 134/132

FOREIGN PATENT DOCUMENTS

| | | | |
|---|---|---|---|
| JP | 57122244 U | 7/1982 | |
| JP | 60112304 U | 7/1985 | |
| JP | 61204049 A | 9/1986 | |
| JP | 61294092 A | 12/1986 | |
| JP | H039328 U | 1/1991 | |
| JP | 03-121292 A * | 5/1991 | ................ F04D 7/04 |
| JP | H0434219 U | 3/1992 | |
| JP | 8282629 A | 10/1996 | |
| JP | 2004-121885 | 4/2004 | |
| JP | 2008284457 A | 11/2008 | |
| WO | 01/83076 | 11/2001 | |

OTHER PUBLICATIONS

Chinese Office Action of Jul. 7, 2014 in the corresponding Chinese Patent Application No. 201080029110.0.
Partial English translation of Chinese office action of Jul. 2014 in CN 201080029110.0.

* cited by examiner

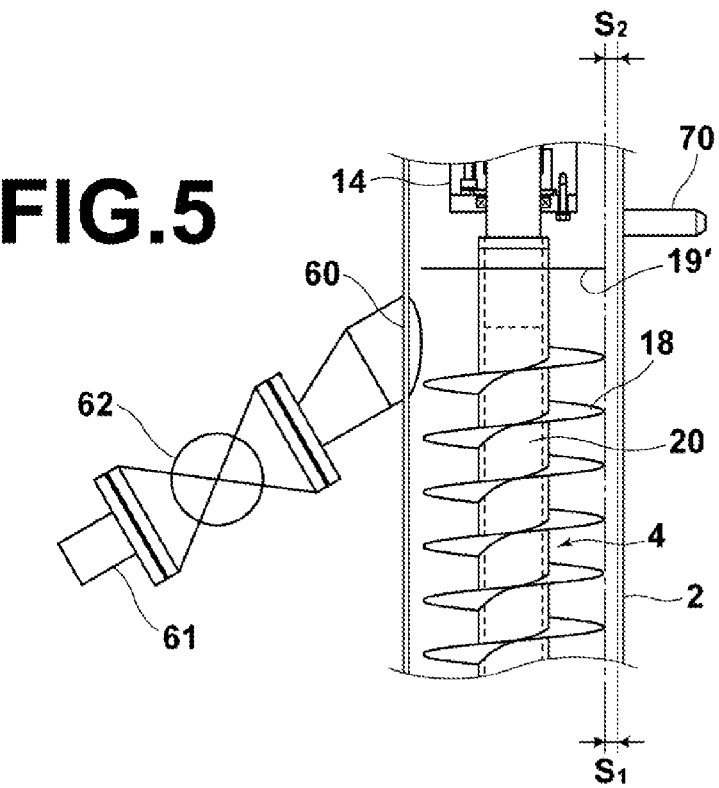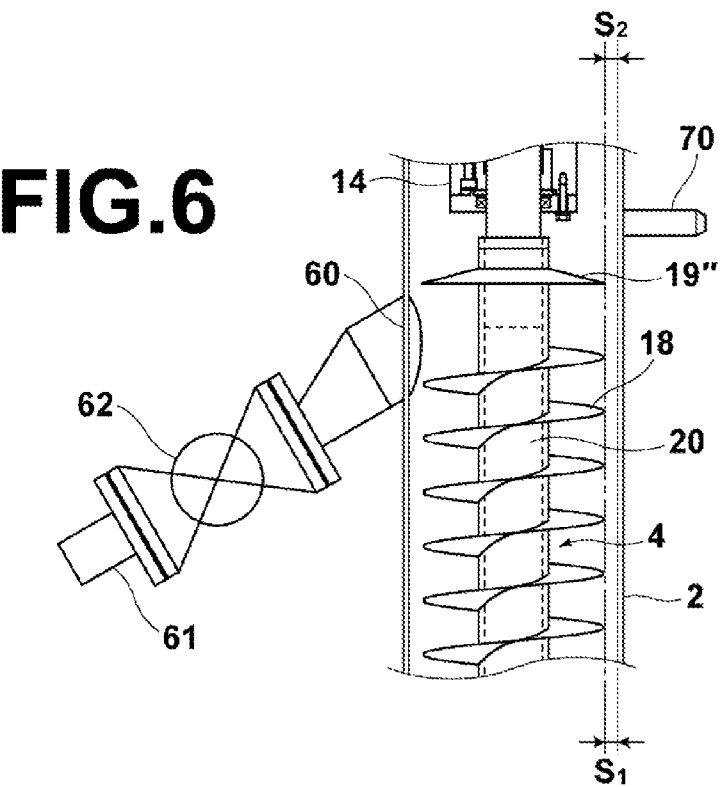

FILTRATION MEDIA CLEANING APPARATUS

CROSS REFERENCE TO RELATED APPLICATION

This is a 371 of PCT/JP2010/004308 filed Jun. 30, 2010, which in turn claimed the priority of Japanese Patent Application Nos. 2009-157551 filed Jul. 2, 2009 and 2010-136283 filed Jun. 15, 2010, all the applications are incorporated by reference herein.

TECHNICAL FIELD

The present invention is related to a filtration media cleansing apparatus. Particularly, the present invention is related to a filtration media cleansing apparatus which is provided at the exterior of and applied to a filtration apparatus that utilizes filtration media to filter contaminants in liquids, such as water.

BACKGROUND ART

If filtration apparatuses are utilized for long periods of time, filtration sand (filtration media) within filtration tanks of the filtration devices becomes clogged due to suspended matter in liquid to be filtered, such as water. This prevents the performance of efficient filtration, and deteriorates the quality of filtered water. For this reason, clogging is eliminated by removing contaminants (suspended matter), which are attached to the filtration media. To this end, it is necessary to exchange the filtration media or to manually remove and cleanse the filtration media from the filtration tank, and to return the cleansed filtration media to the filtration tank after the suspended matter is separated from the filtration media. These operations are highly labor intensive, and also require space to cleanse the removed filtration media. In addition, in the case that the filtration media are to be discarded, a great amount of industrial waste is generated. Therefore there are known filtration apparatus that enable such cleansing operations to be performed automatically and in a space efficient manner.

As an example of a filtration apparatus capable of automatically cleansing filtration media, there is a known filtration apparatus having a cleansing mechanism (cleansing apparatus) for cleansing filtration media within a filtration tank. The cleansing mechanism is caused to operate at predetermined temporal intervals to cleanse the filtration media, and suspended matter which is separated from the filtration media is expelled to the exterior from the filtration tank (Patent Document 1 and Patent Document 2).

However, if a user who is utilizing an existing filtration tank without a built in cleansing apparatus wishes to cleanse filtration sand in a simple manner and with little effort, it would become necessary for the user to purchase a filtration apparatus having a cleansing apparatus as disclosed in Patent Document 1 or Patent Document 2 to replace the user's entire filtration apparatus, which would result in cost increases.

In order to solve this problem, the present applicants have proposed a filtration media cleansing apparatus which is mountable to the exterior of existing filtration apparatuses.
Patent Document 1:
  International Publication No. WO01/83076
Patent Document 2:
  Japanese Unexamined Patent Publication No. 2004-121885
Patent Document 3:
  Japanese Unexamined Patent. Publication No. 2008-284457

Here, the configuration of a filtration media cleansing apparatus 401 which is mountable to the exterior of existing filtration apparatuses will be described with reference to FIG. 15.

The filtration media cleansing apparatus 401 has a metal cylindrical outer cylinder 402, a screw conveyor 404 placed in the interior of the outer cylinder 402, and a drive section 406 coupled to the upper end of the screw conveyor 404. A base 412 having a bearing 414 that axially supports the shaft 416 of the screw conveyor therein is linked to the upper end of the outer cylinder 402. A large diameter portion 434 having an inlet 436, through which filtration media and liquids such as water are introduced, formed therein is linked to the lower end of the outer cylinder 402. An introducing pipe 438 is welded onto the inlet 436. In addition, an outlet 460, through which filtration media are expelled, is formed within a side surface of at the upper end portion of the outer cylinder 402, and an expelling pipe 461 is mounted to the outlet 460. The introducing pipe 438 and the expelling pipe are inserted within a filtration apparatus. Filtration media which are suctioned through the introducing pipe 438 are cleansed within the filtration media cleansing apparatus 401. Thereafter, the cleansed filtration media are expelled into the filtration apparatus through the expelling pipe 461.

In the filtration media cleansing apparatus 401, the screw conveyor 404 is rotated to convey the filtration media suctioned through the inlet 436 upward while scrubbing the filtration media. Thereafter, the cleansed filtration media 460 are expelled through the outlet 460. However, because the upwardly conveying force of the screw conveyor 404 is strong, particles of filtration media enter the bearing 414 through a seal portion 414C of the bearing 414 directly above the screw conveyor. There is a possibility that the filtration media will wear down the bearing 414 and the shaft 416, causing axial shifts to occur and damaging the bearing 414. For this reason, a filtration media cleansing apparatus having improved durability is desired.

The present invention has been developed in view of the foregoing circumstances, and it is an object of the present invention to provide a filtration media cleansing apparatus capable of being externally mounted to an existing filtration apparatus, having improved durability.

DISCLOSURE OF THE INVENTION

A filtration media cleansing apparatus of the present invention is a filtration media cleansing apparatus that cleanses filtration media for purifying liquids, comprising:
  an upright outer cylinder having an inlet through which the filtration media are introduced into the interior of the outer cylinder and an outlet for expelling the filtration media to the exterior of the outer cylinder after cleansing is complete;
  a screw conveyor provided within the outer cylinder so as to be rotatable, equipped with a spiral blade for conveying the filtration media introduced through the inlet upward while scrubbing the filtration media;
  a drive section that rotationally drives the screw conveyor; and
  a control section that controls the rotation of the drive section; characterized by:
  the screw conveyor having a regulating blade that regulates upward movement of the filtration media, provided above the spiral blade coaxially with the screw conveyor and about the periphery of a central shaft thereof; and the outlets being provided to expel the filtration media which are conveyed from the space between the spiral blades and the regulating blade of the screw conveyor.

It is preferable for the outer cylinder of the filtration media cleansing apparatus of the present invention to be equipped with:

a cleansing liquid introducing aperture above at least the regulating blade within the outer cylinder.

Here, the phrase "above . . . the regulating blade" means that the upper end of the cleansing liquid introducing aperture is positioned above the upper end of the regulating blade.

In addition, the "cleansing liquid" is a liquid for causing filtration media which has risen above the regulating blade to flow downward of the regulating blade, and is generally water.

The regulating blade may be a blade formed as a spiral blade having a spiral in a direction opposite that of the spiral blade. In this case, it is preferable for the pitch of the spiral of the regulating blade to be smaller than the pitch of the spiral of the spiral blade.

Alternatively, the regulating blade may be formed in a planar shape, or may be formed in the shape of an umbrella that opens in the downward direction.

In such cases, it is preferable for a planar blade that extends in a direction perpendicular to the plane of the regulating blade and having a surface that faces the rotating direction of the regulating blade to be provided on the upper and/or lower surface of the regulating blade.

The planar blade is not limited to that which extends in a direction completely perpendicular to the plane of the regulating blade, but may be that which is inclined with respect to the direction perpendicular to the plane of the regulating blade. It is preferable for the tip of the planar blade to be inclined rearwardly with respect to the rotating direction of the regulating blade.

The surface of the planar blade is not limited to that which completely faces the rotating direction of the regulating blade (a plane perpendicular to the rotating direction), but may be that which is inclined with respect to the direction that faces the rotating direction. It is preferable for the surface of the planar blade to be inclined rearwardly with respect to the rotating direction of the regulating blade more at the outer peripheral portion of the regulating blade than at the inner peripheral portion of the regulating blade, using the radial direction of the regulating blade as a reference.

It is preferable for a permeation aperture, through which cleansing liquid which is introduced through the cleansing liquid introducing aperture, to be formed in the regulating blade.

Further, the filtration media cleansing apparatus of the present invention may be that which is to be employed as an externally mounted filtration media for a filtration apparatus equipped with a filtration tank having a layer of the filtration media in the interior thereof that filters supplied liquid with the layer of filtration media, and discharges filtered liquid to the exterior of the filtration tank. In this case, the filtration media cleansing apparatus may further comprise pipes for connecting the inlet and the outlet of the outer cylinder with the filtration tank.

The filtration media cleansing apparatus of the present invention comprises: the upright outer cylinder having the inlet through which the filtration media are introduced into the interior of the outer cylinder and the outlet for expelling the filtration media to the exterior of the outer cylinder after cleansing is complete; the screw conveyor provided within the outer cylinder so as to be rotatable, equipped with the spiral blade for conveying the filtration media introduced through the inlet upward while scrubbing the filtration media; the drive section that rotationally drives the screw conveyor; and the control section that controls the rotation of the drive section; and is characterized by: the screw conveyor having the regulating blade that regulates upward movement of the filtration media, provided above the spiral blade coaxially with the screw conveyor and about the periphery of the central shaft thereof; and the outlets being provided to expel the filtration media which are conveyed from the space between the spiral blades and the regulating blade of the screw conveyor. Therefore, the filtration media are prevented from entering structural portions above the screw conveyor, and the durability of the filtration media cleansing apparatus can be improved.

The outer cylinder of the filtration media cleansing apparatus of the present invention may be equipped with the cleansing liquid introducing aperture above at least the regulating blade within the outer cylinder. In this case, cleansing liquid may be introduced through the cleansing liquid introducing aperture above the regulating blade, to cause filtration media which has risen above the regulating blade to flow downward of the regulating blade. If such a configuration is adopted, the advantageous effects of the present invention can be further enhanced.

The regulating blade may be a blade formed as a spiral blade having a spiral in a direction opposite that of the spiral blade. If this configuration is adopted, filtration media which are conveyed above the outlet can be pushed back downward. Therefore, filtration media can be effectively prevented from entering structural portions above the screw conveyor.

At this time, if the filtration media are pushed downward with an excessive amount of force, the downwardly pushed filtration media may impact filtration media which are conveyed upward from the inlet, and the filtration media may not be expelled smoothly through the outlet. For this reason, the pitch of the spiral of the regulating blade is formed to be smaller than the pitch of the spiral of the spiral blade, to prevent such a problem from occurring and to enable smooth expulsion of the filtration media.

The regulating blade may be formed in a planar shape, or may be formed in the shape of an umbrella that opens in the downward direction. In such cases, the present invention can be realized with a simple structure.

At this time, a planar blade that extends in a direction perpendicular to the plane of the regulating blade and having a surface that faces the rotating direction of the regulating blade may be provided on the upper and/or lower surface of the regulating blade. In this case, expulsion of the filtration media can be realized more smoothly.

Further, a permeation aperture, through which cleansing liquid which is introduced through the cleansing liquid introducing aperture, may be formed in the regulating blade. In this case, the cleansing liquid introduced from above the regulating blade can be caused to flow downward smoothly.

BRIEF DESCRIPTION OF THE DRAWINGS

[FIG. 5] A partial enlarged view of a modified screw conveyor of the filtration media cleansing apparatus.

[FIG. 6] A partial enlarged view of a modified screw conveyor of the filtration media cleansing apparatus.

BEST MODE FOR CARRYING OUT THE INVENTION

Figure 1:
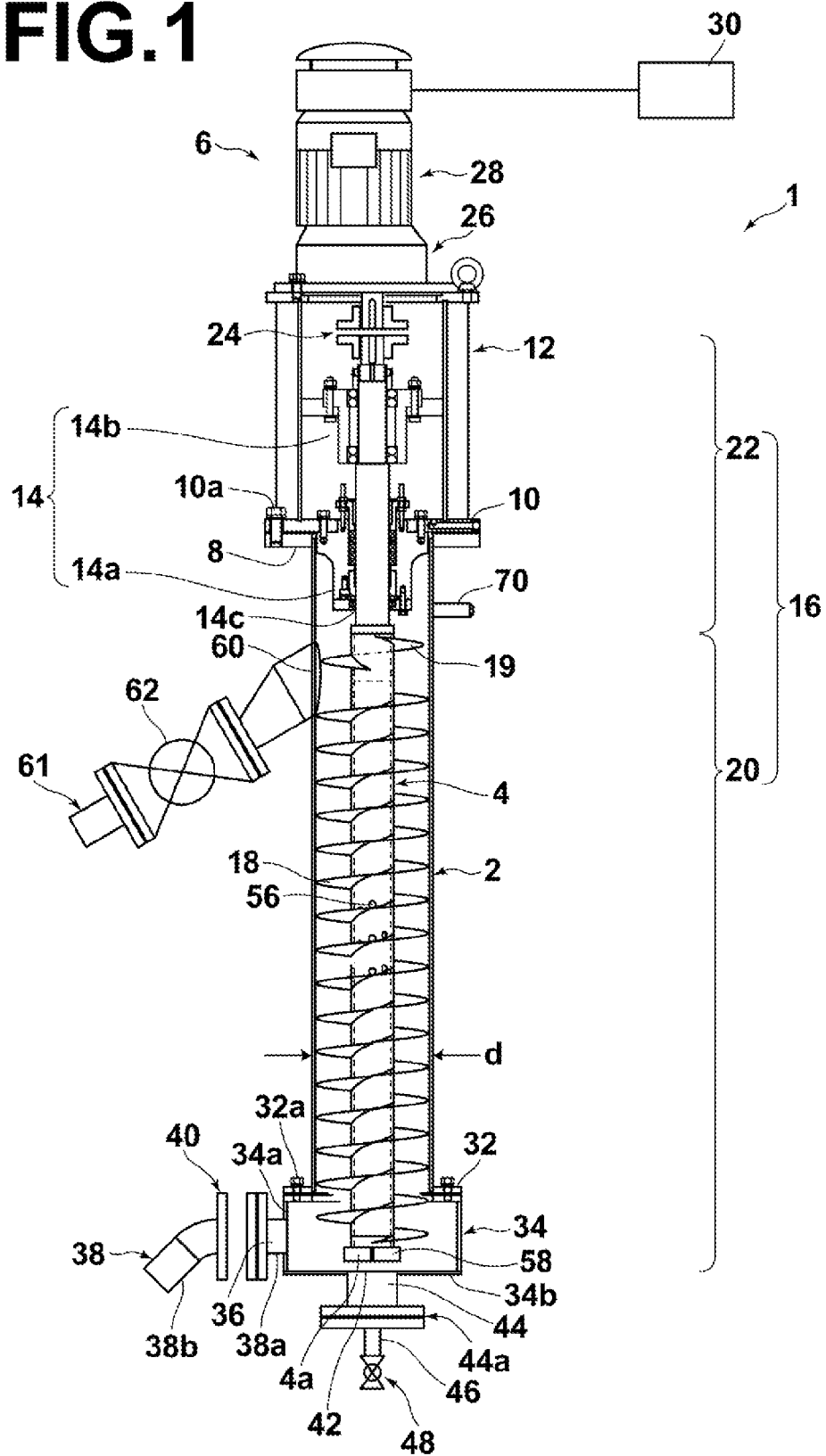
[FIG. 1] A schematic vertical sectional view that illustrates an externally mounted filtration media cleansing apparatus according to an embodiment of the present invention.
Figure 2:
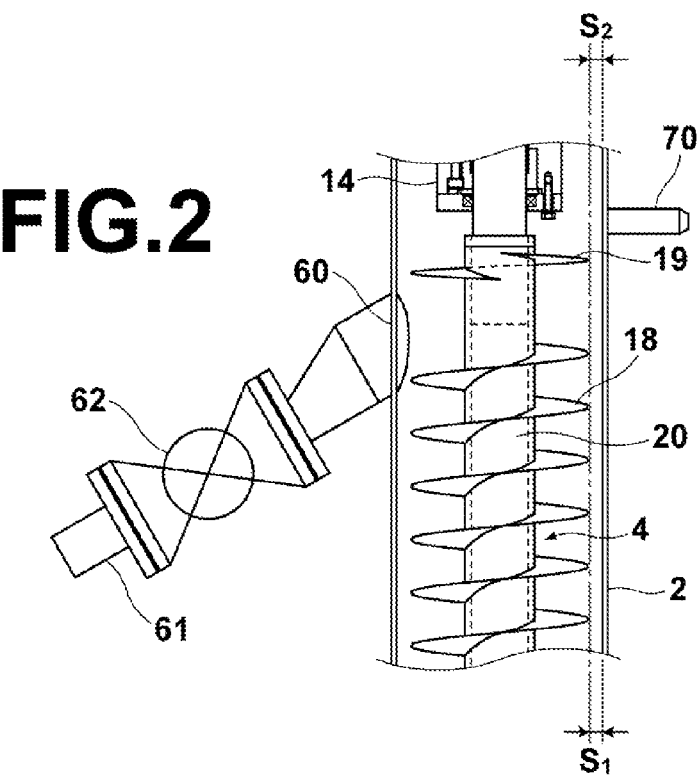
[FIG. 2] A partial enlarged view of the filtration media cleansing apparatus.
Figure 3A:
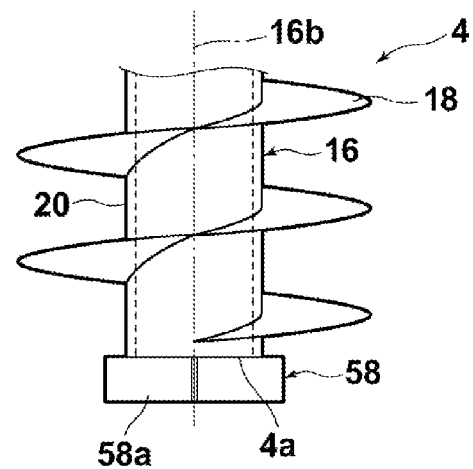
[FIG. 3A] A partial enlarged (front) view of the filtration media cleansing apparatus.
Figure 3B:
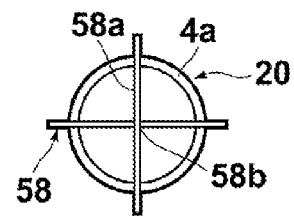
[FIG. 3B] A partial enlarged (bottom) view of the filtration media cleansing apparatus.
Figure 4:
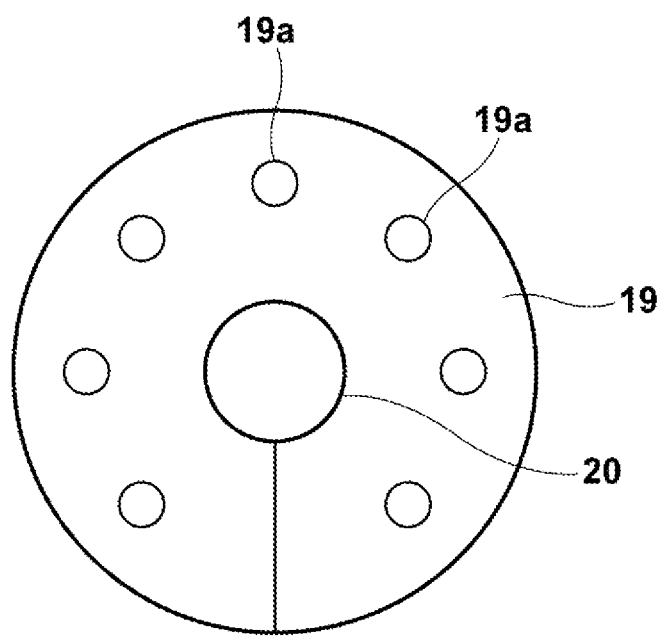
[FIG. 4] A plan view of a screw conveyor of the filtration media cleansing apparatus.

Hereinafter, filtration media cleansing apparatuses (hereinafter, simply referred to as "cleansing apparatus") to be mounted on the exteriors of filtration apparatuses according to the present invention will be described in detail with reference to the attached drawings. FIG. 1 is a schematic vertical sectional view that illustrates an externally mounted filtration media cleansing apparatus 1 according to an embodiment of the present invention. FIGS. 2, 3A, and 3B are partial enlarged views of the filtration media cleansing apparatus. FIG. 4 is a plan view of a screw conveyor of the filtration media cleansing apparatus.

As illustrated in FIG. 1, the cleansing apparatus 1 is equipped with: a cylindrical metal outer cylinder 2; a screw conveyor 4 provided in the interior of the outer cylinder 2; and a drive section 6 linked to the upper end of the screw conveyor 4. The outer cylinder 2 is equipped with a flange 8 at the upper end thereof. A base 12 having a flange 10 corresponding to the flange 8 is provided on the flange 8. The base 12 is fixed to the outer cylinder 2 by the flanges 8 and 10 being fixed to each other by bolts 10a.

A bearing 14 for axially supporting the shaft 16 of the screw conveyor 4 is formed in the base 12. The bearing 14 is constituted by a bearing 14a toward the side of the flange 10 and a bearing 14b provided at an intermediate position in the height direction of the base 12. The shaft 16 of the screw conveyor 4 is formed by: a hollow, that is, a pipe shaped hollow shaft 20, on which a spiral blade 18 is formed; and a support shaft portion 22 having a slightly smaller diameter than the hollow shaft 20, which is inserted into the upper end of the hollow shaft 20 and fixed thereto by welding. The support shaft portion 22 is axially supported by the bearing 14. A joint 24 is coupled to the upper end of the support shaft portion 22. The drive section 6, that is, a braking mechanism 26 and a motor 28 connected to the braking mechanism 26, is provided on the base 12. A control section 30 having an inverter circuit, for example, for controlling the rotational speed of the motor 28, is electrically connected to the motor 28. Here, the control section 30 is illustrated schematically.

A flange 32 is formed at the lower portion of the outer cylinder 2, and a large diameter portion 34 is linked to the flange 32 by bolts 32a. In other words, the lower portion of the outer cylinder 2 is formed as the large diameter portion 34. The large diameter portion 34 is shaped as a cylinder having a low height and a greater diameter than the diameter d of the outer cylinder 2. The lower end 4a of the screw conveyor 4 is positioned within the large diameter portion 34. An inlet 36, through which filtration media 112a (refer to FIG. 9) and liquid such as water (backwash liquid 122, refer to FIG. 9) are introduced, is formed in a side surface 34a of the large diameter portion 34. An introducing pipe 38 is welded to and attached to the inlet 36. In the present embodiment, the introducing pipe 38 may be a pipe which is integrally linked with a pipe or a hose of a desired shape via a flange 40, as illustrated in FIG. 1. Alternatively, the introducing pipe 38 may be a single long pipe connected to the inlet 36 without the intermediary flange 40. The material of the introducing pipe 36 may be metal, synthetic resin, rubber, etc.

An injection aperture 42 is formed in the bottom wall 34b of the large diameter portion 34, and an injection pipe 44 is connected to the injection aperture 42. The injection pipe 44 is connected to a small diameter pipe 46 via a flange 44a. A ball valve 48 is mounted on the pipe 46. The ball valve 48 is generally closed, but is opened as necessary to supply water, etc. to the interior of the outer cylinder 2. The injection pipe 44 is utilized to dilute backwash liquid 122 that includes the filtration media 112a and suspended matter introduced from the introducing pipe 38, that is, slurry, in cases that the concentration of the slurry is high, to facilitate conveyance, and to inject priming water into the outer cylinder 2.

Meanwhile, an outlet 60, through which the filtration media 112a are expelled, is formed on the side surface of the upper end portion of the outer cylinder 2. An expelling pipe 61 is attached to the outlet 60 by welding, for example. A ball valve 62 is mounted in the expelling pipe 61. However, the ball valve 62 is not necessarily required according to applications of the cleansing apparatus 1 to be described later. Note that the ball valve 61 may alternatively be a pinch valve.

The shaft 16 of the screw conveyor 4 is hollow from the lower end 4a of the hollow shaft 20 to the lower end of the support shaft portion 22 inserted therein. A plurality of apertures 56 are formed in the intermediate portion of the hollow shaft 20.

Here, the screw conveyor 4 will be described in detail with reference to FIGS. 2 through 4. FIG. 2 is a partial enlarged sectional view of the vicinity of the outlet of the outer cylinder 2 of the cleansing apparatus 1. FIG. 4 is a plan view of the screw conveyor of the filtration media cleansing apparatus 1. Note that the outer shape of the screw conveyor 4 is illustrated in FIG. 2. The spiral blade 18 of the screw conveyor 4 is formed as a spiral on the outer periphery of the hollow shaft 20. Neither apertures nor slots are formed in the spiral blade 18, and the entire surface thereof is in the form of a screw. Accordingly, the backwash liquid 122 that contains the filtration media 112a can be effectively conveyed upward.

A slight gap $S_1$ exists between the outer periphery of the spiral blade 18 and the inner surface of the outer cylinder 2. The dimension of the gap $S_1$ is set to be slightly larger than 0.6 mm to 1.0 mm, in the case that the particle size of the filtration media 112a is 0.6 mm to 1.0 mm. The reason for this is as follows. As the filtration media 112a are conveyed upward by the screw conveyor 4, the filtration media move toward the outer periphery of the spiral blade 18 due to centrifugal force caused by rotation of the screw conveyor 4. The gap $S_1$ prevents the filtration media 112a from being crushed between the outer edge of the spiral blade 18 and the inner surface 2a of the outer cylinder 2. In addition, the degree of sealing between the screw conveyor 4 and the outer cylinder 2 improves by the filtration media 112a and separated suspended matter being present within the gap $S_1$, thereby improving the conveyance efficiency of the filtration media 112a and the backwash liquid 122.

The apertures 56 (refer to FIG. 1) are formed at positions directly above a mounting portion that mounts the spiral blade 18 to the hollow shaft 20. The backwash liquid 122 on the spiral blade 18 can enter the apertures 56 smoothly along the spiral blade 18, by the apertures 56 being positioned directly above the spiral blade 18. The apertures 56 are formed along the mounting portion at angular intervals of 45 degrees throughout two pitches of the spiral blade 18. The cleansing apparatus 1 is installed such that the positions of the apertures 56 are above the water level of the backwash liquid 122 within the filtration tank of which the filtration media are to be cleansed. Because the interior of the hollow shaft 20 is hollow, it is possible for a portion of the backwash liquid 122 conveyed upward to enter the hollow portion through the apertures 56. In this manner, the apertures 56 function to drain the conveyed backwash liquid 122. The number of apertures 56 and the intervals along the circumference of the hollow shaft 20 are not limited to those of the present embodiment described above. It goes without saying that these values can be set as appropriate according to intended use.

In addition, a regulating blade 19, which is formed about the periphery of the hollow shaft 20 coaxially with the screw conveyor 4 and above the outlet 60, that regulates upward movement of the filtration media 112a is provided. Further, a cleansing liquid introducing aperture 70 is formed in the outer cylinder 2 above the regulating blade 19. The cleansing liquid introducing aperture 70 is connected to an external water source by a hose or the like.

The regulating blade 19 is a spiral blade having spirals formed in the opposite direction as those of the spiral blade 18. The regulating blade 19 is formed to be of a size such that a slight gap $S_2$ is present between the outer periphery of the regulating blade 19 and the inner surface of the outer cylinder 2. Note that the pitch of the spirals of the regulating blade 19 is smaller than the pitch of the spirals of the spiral blade 18. In addition, a plurality of apertures 19a are provided in the regulating blade 19, as illustrated in FIG. 4.

During rotation of the screw conveyor 4, the regulating blade 19 prevents the filtration media 112a from moving above the outlet 60. Further, cleansing liquid is introduced through the cleansing liquid introducing aperture 70 provided above the regulating blade 19. The cleansing liquid causes filtration media 112a which have risen above the regulating blade 19 to flow downward, by flowing through the gap $S_2$ between the outer periphery of the regulating blade 19 and the inner surface of the outer cylinder 2, and through the plurality of apertures 19a formed in the regulating blade 19. The filtration media 112a are prevented from entering a seal portion 14C of the bearing 14 provided above the screw conveyor in this manner, and thereby the durability of the cleansing apparatus 1 is improved.

Next, the shape of the lower end of the screw conveyor 4 will be described with reference to FIG. 3. FIG. 3 is a collection of partial enlarged views of the lower end portion of the screw conveyor 4. FIG. 3A is a front view, and FIG. 3B is a bottom view. As illustrated in FIGS. 3A and 3B, an agitating blade 58 is attached to the lower end 4a of the hollow shaft 20 of the screw conveyor 4. The agitating blade 58 is constituted by four ribs 58a having the same length. The ribs 58a are constituted by configuring two metal plates having lengths greater than the diameter of the hollow shaft 20 to form a cross. The agitating blade 58 is attached to the lower end 4a of the hollow shaft 20 by welding such that the position of the center of the cross, that is, the intersection 58b of the two metal plates, and the position of the rotational center 16 of the shaft 16 are matched. Accordingly, the hollow portion of the hollow shaft 20 communicates with the exterior.

Note that the agitating blade 58 agitates the filtration media 112a in the case that the concentration of the backwash liquid 122 that includes the filtration media 112a and suspended matter introduced from the introducing pipe 38, that is, slurry, is high. Agitation by the agitating blade 58 prevents the filtration media 112a from remaining in the lower portion of the outer cylinder 2. Accordingly, a configuration may be adopted in which the agitating blade 58 is not provided, in the case that the concentration of the liquid is low. For example, the agitating blade 58 may simply be omitted, or the lower end 4a may be of a closed shape.

Note that the shape of the regulating blade 19 provided coaxially with the screw conveyor is not limited to that described above. The regulating blade 19 may be formed as other shapes, as illustrated in FIG. 5 and FIG. 6. Note that FIG. 5 and FIG. 6 are both partial enlarged sectional views corresponding to FIG. 2. That is, any shape may be adopted as long as the regulating blade 19 is capable of preventing upward movement of the filtration media, such as the planar regulating blade illustrated in FIG. 5, and the regulating blade formed as a downwardly opening umbrella illustrated in FIG. 6.

Figure 7:
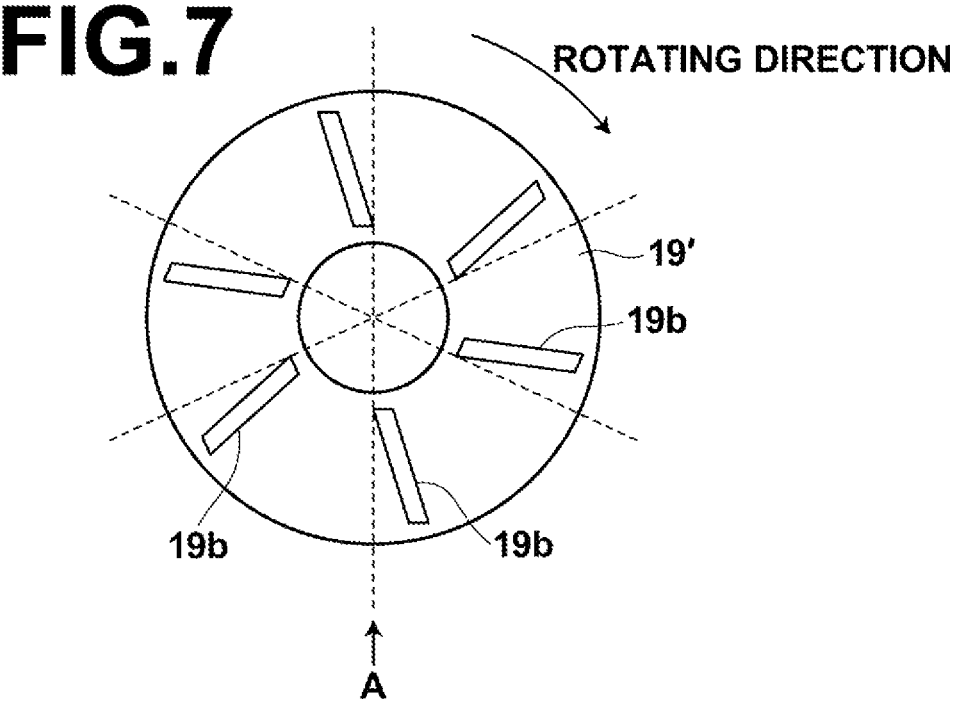
[FIG. 7] A plan view of a modified screw conveyor of the filtration media cleansing apparatus.
Figure 8:
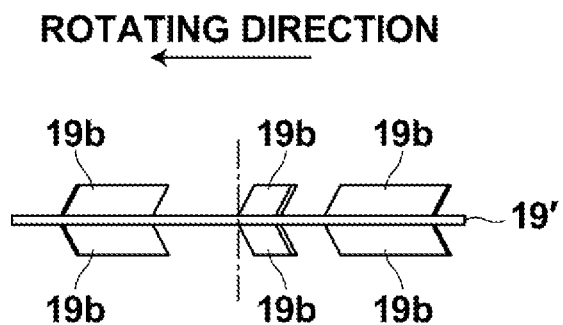
[FIG. 8] A side view of a modified screw conveyor of the filtration media cleansing apparatus.

In the case that the regulating blade is shaped in a planar shape or in the shape of an umbrella, it is preferable for planar blades 19b that extend in a direction perpendicular to the plane of the regulating blade 19' and having a surface that faces the rotating direction of the regulating blade 19' to be provided on the upper and lower surfaces of the regulating blade 19', as illustrated in FIG. 7 and FIG. 8. Note that FIG. 7 is a plan view of the screw conveyor, and FIG. 8 is a side view taken along the direction of arrow A of FIG. 7. FIG. 7 and FIG. 8 illustrate an example in which the regulating blade is of a planar shape. However, the following description applies to cases in which the regulating blade is shaped as an umbrella as well.

It is preferable for the tips of the planar blades 19b to be inclined rearwardly with respect to the rotating direction of the regulating blade, as illustrated in FIG. 8.

In addition, it is preferable for the surfaces of the planar blades 19b to be inclined rearwardly with respect to the rotating direction of the regulating blade more at the outer peripheral portion of the regulating blade than at the inner peripheral portion of the regulating blade, using the radial direction of the regulating blade (the direction indicated by the dotted lines in FIG. 7) as a reference, as illustrated in FIG. 7.

FIG. 7 and FIG. 8 illustrate an example in which six planar blades 19b are provided on the upper surface (and the lower surface) of the regulating blade 19'. However, the number of planar blades 19b is not particularly limited, and any number of planar blades 19b may be provided.

In addition, FIG. 7 and FIG. 8 illustrate an example in which the planar blades 19b are formed as parallelograms. However, the shape of the planar blades 19b is not particularly limited, and the planar blades 19b may be of any shape.

Further, the planar blades 19b are provided on both the upper surface and the lower surface of the regulating blade 19'. Alternatively, the planar blades 19b may be provided only on one of the upper surface and the lower surface of the regulating blade 19'.

Figure 9:
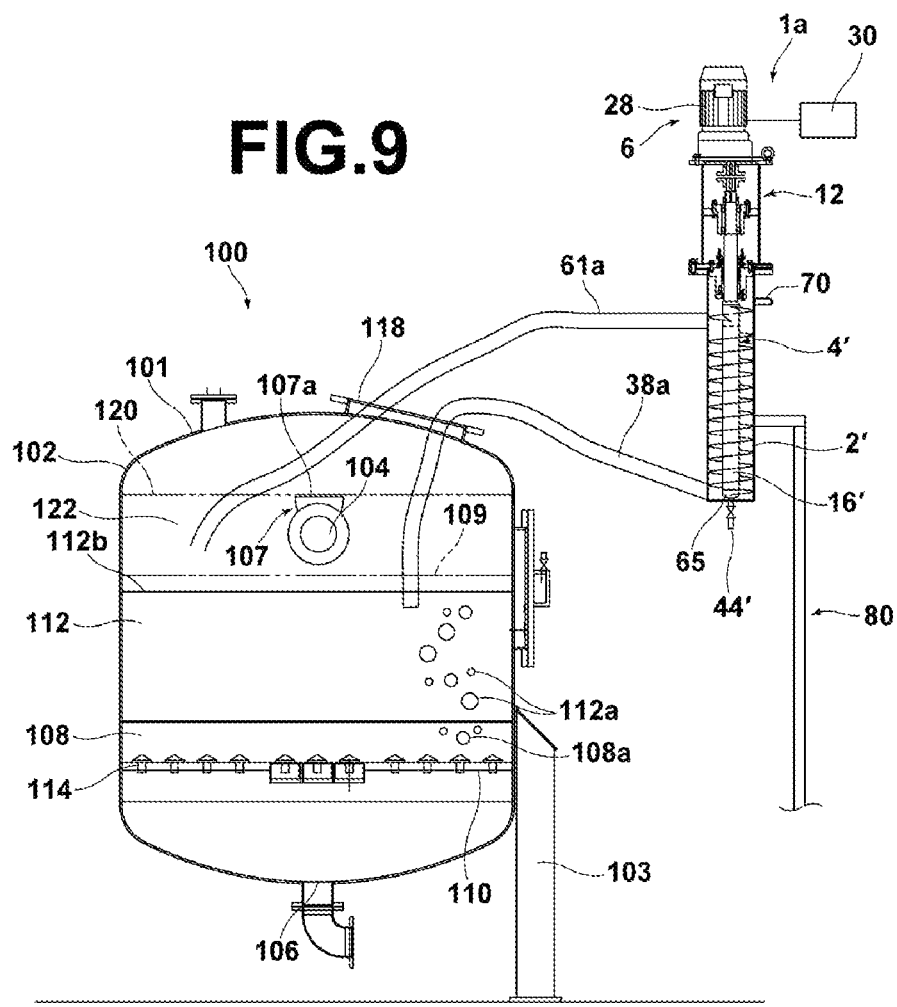
[FIG. 9] A diagram that illustrates a first application of a filtration media cleansing apparatus according to another embodiment of the present invention.
Figure 10:
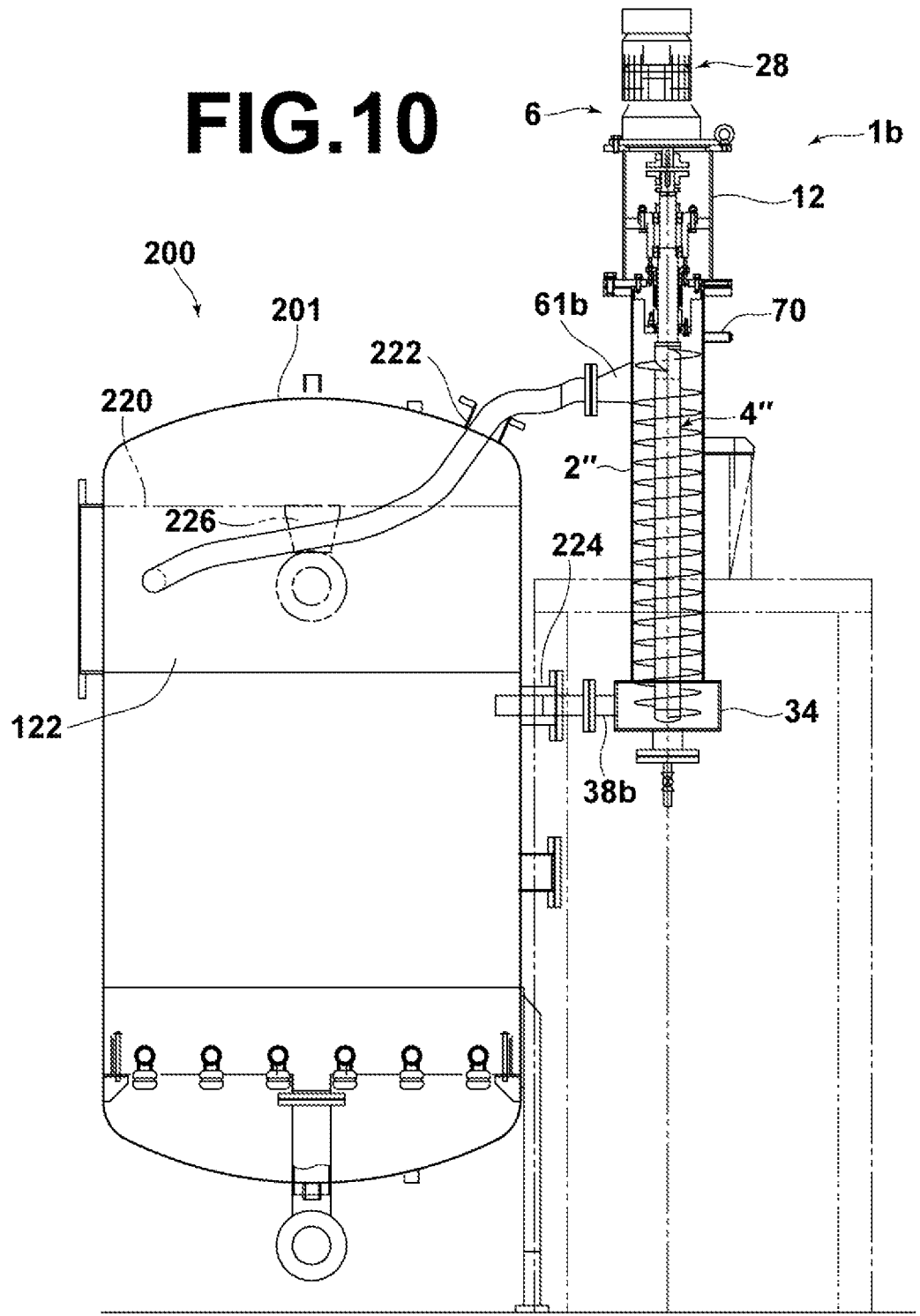
[FIG. 10] A diagram that illustrates a second application of a filtration media cleansing apparatus according to another embodiment of the present invention.
Figure 11:
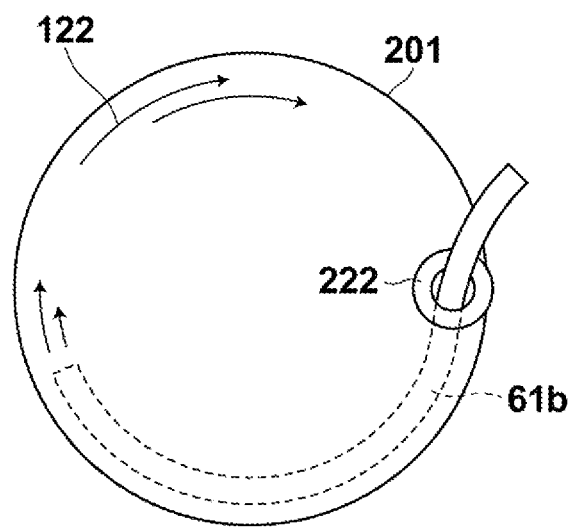
[FIG. 11] A schematic plan view of the filtration media cleansing apparatus of FIG. 9.

Next, examples of applications of the cleansing apparatus 1 configured as described above to existing filtration apparatuses will be described with reference to FIG. 9 through FIG. 11. Note that here, the filtration apparatuses refer to the entireties of apparatuses having filtration tanks, support legs, and other associated components. FIG. 9, FIG. 10, and FIG. 11 illustrate a first example, a second example, and a third example of application, respectively. First, a case in which a cleansing apparatus 1a is applied to a filtration tank 101 of a filtration apparatus 100 will be described with reference to FIG. 9. Here, the cleansing apparatus 1a according to an alternate embodiment which is utilized here is basically the same as the cleansing apparatus 1 described above, except that the positions and shapes of an expelling pipe 61a and an introducing pipe 38a differ from those of the expelling pipe 61 and the introducing pipe 38. In addition, the cleansing apparatus 1a differs from the cleansing apparatus 1 in that the cleansing apparatus 1a does not have the large diameter portion 34 at the lower part of the outer cylinder 2 nor the agitating blade 58. A cap 65, for example, is provided at the lower end of a shaft 16' of a screw conveyor 4' of the cleansing apparatus 1a to seal the opening of the shaft 16'. The cleansing apparatus 1a is supported by an appropriate support 80. Note that in the following description, the same components will be described using the same reference numbers. In addition, components for which descriptions are not necessary will be denoted by the reference numbers of the corresponding components of the embodiment of FIG. 1, and descriptions thereof will be omitted.

The filtration tank 101 is of a typical shape, having a cylindrical outer shell 102, of which the top and bottom are sealed by curved protruding surfaces, and is supported by support legs 103. A water injecting opening 104, through which water including suspended matter, that is, water to be filtered, is injected, is formed at the upper portion of the side surface of the outer shell 102, and an expelling opening 106 is formed in the lower portion of the outer shell 102. In addition, a large diameter manhole 118 is formed on the upper surface of the outer shell 102.

For example, the filtration tank 101 has a plate 110 with a strainer 114, a gravel layer 108 of gravel 108 having a large particle size on the plate 110, and a filtration media layer 112 of filtration media 112a having a small particle size on the gravel layer 108 up to a level 112b, as illustrated in FIG. 9. The water to be filtered is injected through the water injecting opening 104, and is filtered by passing through the filtration media 112a in the filtration media layer 112 and the gravel 108a in the gravel layer 108. Purified liquid, from which suspended matter has been removed, is supplied to the exterior from the expelling opening 106 via the strainer 114.

In the case of the filtration tank 101 configured as described above, the opening portion of the manhole 118 is comparatively large. Therefore, the expelling pipe 61a and the introducing pipe 38a can be inserted through the manhole 118, to utilize the cleansing apparatus 1a without modifying or changing the configuration of the existing filtration tank 101.

The method by which the filtration media 112a of the filtration tank 101 is cleansed after the filtration tank 101 and the cleansing apparatus 1a are installed in this manner will be described hereinbelow. During normal filtration, the filtration media 112a are at the height of level 112b. However, when filtration is ceased and backwash cleansing, which is a preliminary step to cleansing, is performed, the backwash liquid 122 expands, and rises to an opening 107a of an internal pipe 107 indicated as level 120. That is, when cleansing liquid 122 is sprayed into the filtration tank 101 through the expelling opening 106 to perform backwash cleansing, the backwash liquid 122 passes through the strainer 114 and the gravel 108 to be sprayed into the filtration media layer 112. When the backwash liquid 122 is sprayed into the filtration media layer 112, the filtration media 112a expand are caused to flow. However, the filtration media 112a will not rise to the liquid surface of the expanded backwash liquid 122 at level 120, but rather flows upward to approximately level 109, which is positioned slightly above level 112b. The liquid beneath level 109 is slurry (suspension liquid). Accordingly, the distribution density of the filtration media 112a distributed in the slurry becomes low. However, the suspended matter which has been separated from the filtration media 112a by the backwash operation flows upward to level 120, because it is lighter than the filtration media 112a.

The motor 28 is driven in this state. In the case of this application, the screw conveyor 4' is positioned higher than the liquid surface level 120 of the backwash liquid 122. Therefore, it is difficult to suction the backwash liquid 122 only by rotating the screw conveyor 4'. For this reason, it is necessary to inject priming water from an injecting pipe 44'. Thereafter, the motor 28 is driven, to introduce the backwash liquid 122 and the filtration media 112a from within the filtration tank 101 to an outer cylinder 2'.

The filtration media 112a which are introduced into the lower portion of the outer cylinder 2' are conveyed upward while being scrubbed by the spiral blade 18 of the screw conveyor 4'. The filtration media 112a are cleansed during the upward conveyance, and suspended matter is separated from the filtration media 112a. The cleansed filtration media 112a are expelled into the filtration tank 101 through the expelling pipe 61a, along with the backwash liquid 122 that includes the separated suspended matter. Because the filtration media 112a do not flow between the slurry level 109 and level 120, only the backwash liquid 122 that includes suspended matter flows out through the internal pipe 107. At this time, the backwash liquid 122 is constantly being injected into the filtration tank 101 through the expelling opening 106. Therefore, the backwash liquid 122 that includes suspended matter is continuously expelled to the exterior through the internal pipe 107. Accordingly, the amount of suspended matter included in the backwash liquid 122 that circulates between the filtration tank 101 and the cleansing apparatus 1a gradually decreases. The control section 30 performs operations such that the screw conveyor 4' is rotated at a speed suited for scrubbing. It is preferable for the rotational speed to be set such that the outer edges of the screw conveyor 4' move circumferentially at 4m/second or less, in the case that the radius of the screw conveyor 4' is 10 cm.

The above process is repeatedly performed for a predetermined amount of time, to remove suspended matter from the interior of the filtration tank 101. Thereafter, the introducing pipe 38a and the expelling pipe 61a are removed, to enable normal filtration operations to be resumed. The cleansing apparatus 1a may be installed at a predetermined position in the vicinity of the filtration tank 101, or installed in the vicinity of the filtration tank 101 only when necessary. Note that backwash cleansing may be continued for a period of time after cleansing by the cleansing apparatus 1a is complete, to expel the suspended matter within the backwash liquid.

Next, a second example of an application of a cleansing apparatus 1b according to another embodiment of the present invention will be described with reference to FIG. 10 and FIG. 11. FIG. 10 is a vertical sectional view of the cleansing apparatus 1b, and FIG. 11 is a schematic plan view of a filtration tank 201 that illustrates the position of an expelling pipe which is placed within the filtration tank 201. Here, the cleansing apparatus 1b illustrated in FIG. 10 is basically the same as the cleansing apparatus 1 illustrated in FIG. 1, except that the position and the shape of an expelling pipe 61b differ from those of the expelling pipe 61. In addition, the control section 30 is omitted from FIG. 10. Note that in the following description, the filtration tank 201 of a filtration apparatus 200 is the same as the filtration tank 101 in principle. Therefore, only the main components will be described, and a detailed description will be omitted. A screw conveyor 4" is of the same shape as the screw conveyor 4' of FIG. 9. In the case of the second application, some modifications to the existing filtration tank 201 are required. The modifications are that a mounting portion 222 for the expelling pipe 61b is provided at the upper portion of an outer shell 202, and a mounting portion 224 for an introducing pipe 38b is provided at the approximate center in the height direction of the outer shell 202. The water level in this filtration tank 201 during backwash cleansing is indicated by reference numeral 220 in FIG. 10. Meanwhile, the lower end portion of the cleansing apparatus 1b, that is, the large diameter portion 34, is connected to the mounting portion 224 by the introducing pipe 38b, which is substantially horizontal. Therefore, a portion of an outer cylinder 2" lower than the middle thereof is positioned beneath level 220. Accordingly, the backwash liquid enters the outer cylinder 2" up to the middle portion thereof through the introducing pipe 38b during backwash cleansing. Therefore, priming water is not necessary in the second application. The operation of the motor 28 is performed during backwash cleansing in the same manner as in the first application. In the filtration tank 201, expulsion of the backwash liquid 122 is performed by a conical internal pipe 226 that communicates with the exterior of the filtration tank 201.

As illustrated in FIG. 10 and FIG. 11, the expelling pipe 61b may be long. If the expelling pipe 61b is placed along the inner circumference of the filtration tank 201, the backwash liquid 122 expelled through the expelling pipe 61b will flow out along the inner circumference of the filtration tank 201 as indicated by the arrows illustrated in FIG. 11. The flow of the backwash liquid 122 agitates the filtration media 112a, to introduce slurry that includes the filtration media 112a evenly into the introducing pipe 38b, and the cleansing effect is improved further.

Note that in the application illustrated in FIG. 10 and FIG. 11, the mounting portion 222 at which the expelling pipe 61b is positioned is provided on the same side of the filtration tank 201 as the mounting portion 224 at which the introducing pipe 38b is positioned. Alternatively, the mounting portion 222 may be provided at the side of the filtration tank 201 opposite that at which the mounting portion 224 is provided, that is, the side farther from the mounting portion 224. in this case, the filtration media 112a expelled from the expelling pipe 61b are expelled at a position remote from the mounting portion 224, and introduction of slurry which has not been cleansed yet into the cleansing apparatus 1b is facilitated. This point applies to the application described previously with reference to FIG. 9 and also to the application to be described below. It is preferable for the expelling pipe 61b to be formed by a flexible material.

Figure 12:
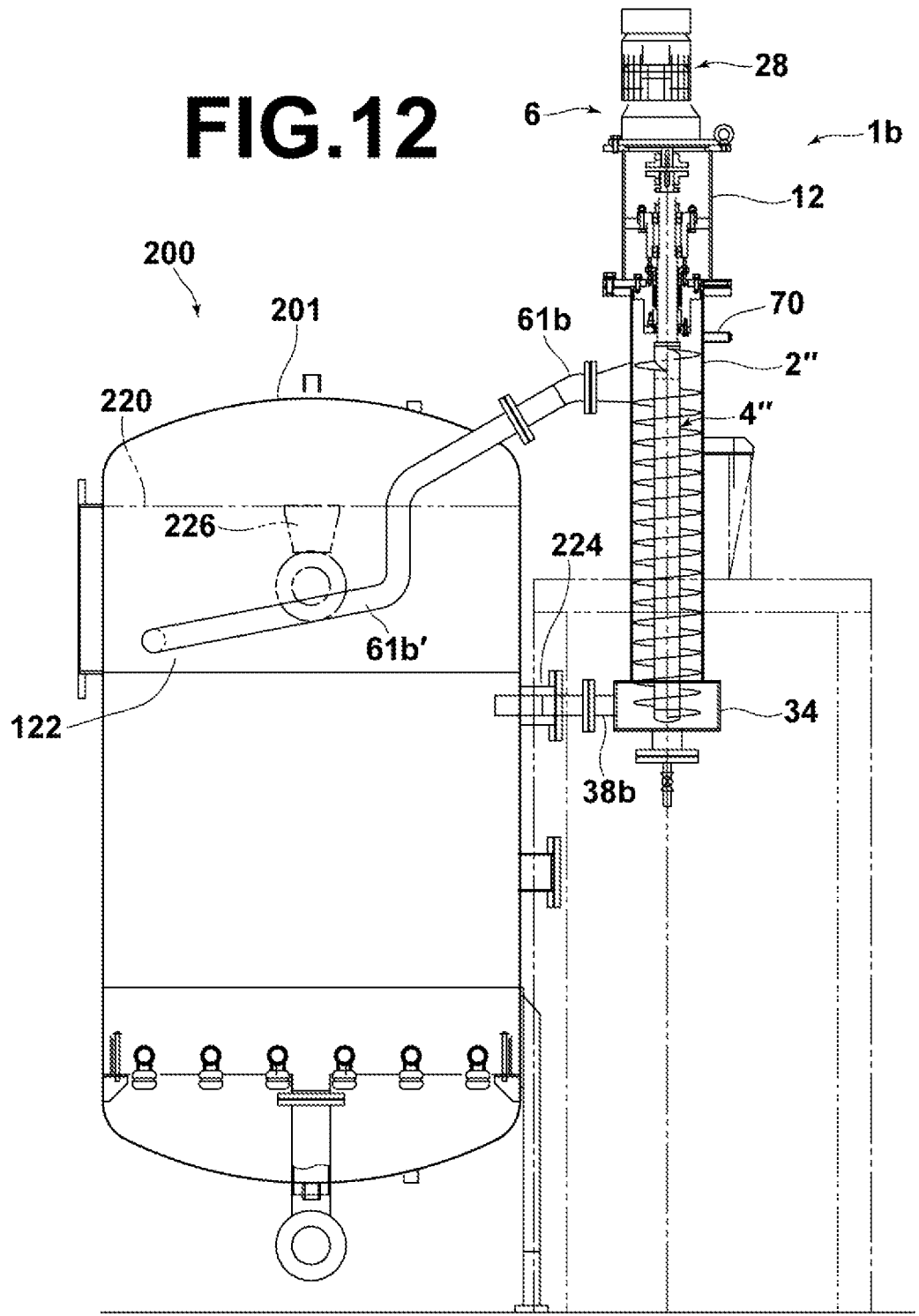
[FIG. 12] A vertical sectional view of a modification to the applications of FIG. 10 and FIG. 11.
Figure 13:
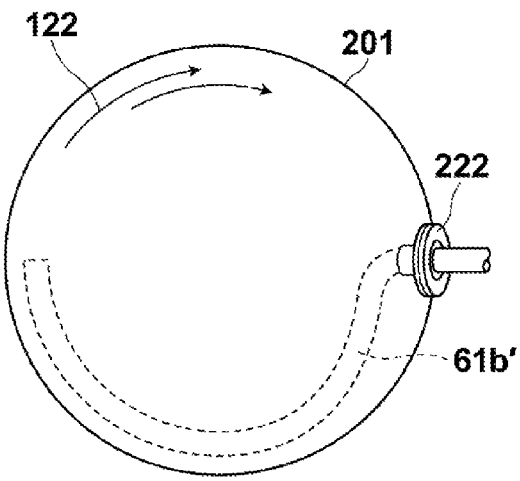
[FIG. 13] A schematic plan view of a modification to the applications of FIG. 10 and FIG. 11.

Next, a modification to the application illustrated in FIG. 10 and FIG. 11 will be described with reference to FIG. 12 and FIG. 13. Note that components which are the same will be denoted with the same reference numerals, and detailed descriptions thereof will be omitted. FIG. 12 and FIG. 13 are a vertical sectional view and a schematic plan view that respectively correspond to FIG. 10 and FIG. 11. This modification differs from the application illustrated in FIG. 10 and FIG. 11 in that a tip 61b' of the expelling pipe 61b is a metallic pipe. Accordingly, the tip 61b' is directly and integrally attached to the filtration tank 201 by welding. Because the metallic expelling pipe 51b' is fixed to the filtration tank 201 in a sealed manner, the interior of the filtration tank 201 can be filled with water to be filtered during normal filtration operations without removing the expelling pipe 61b, which improves efficiency. In addition, other advantageous effects, such as the usable life of the expelling pipe 61b' being long, and that the installation position does not move, are obtained.

Figure 14:
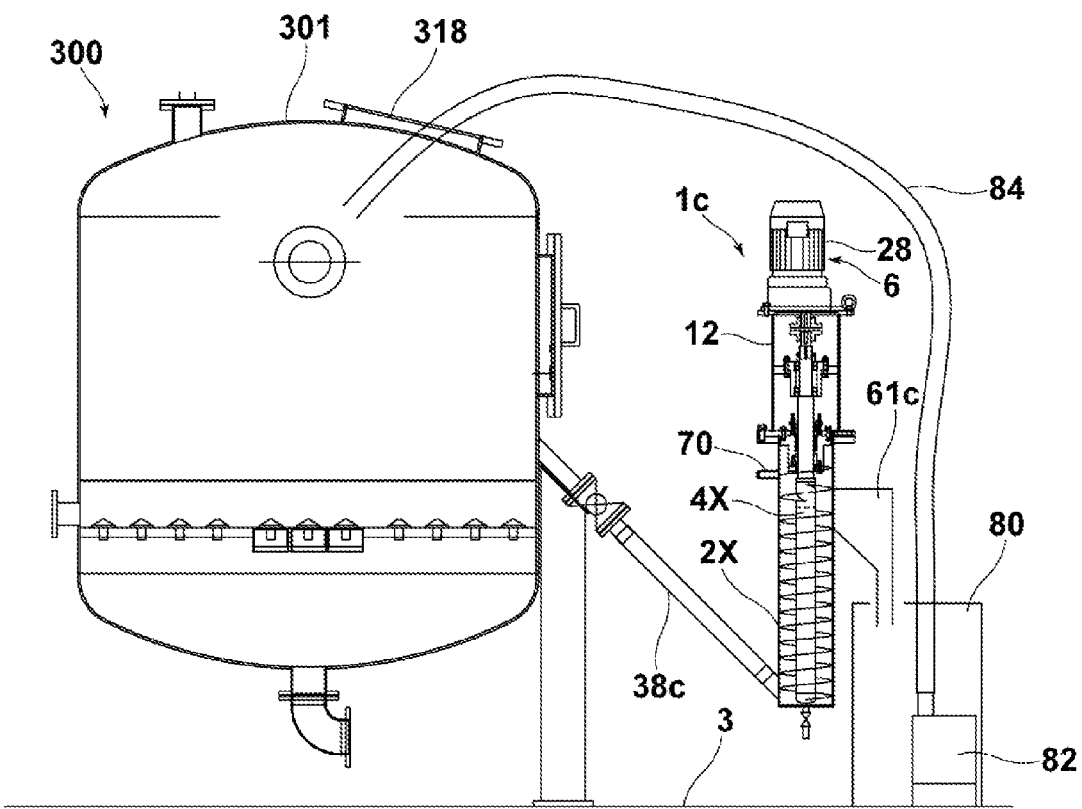
[FIG. 14] A diagram that illustrates a third application of a filtration media cleansing apparatus according to yet another embodiment of the present invention.
Figure 15:
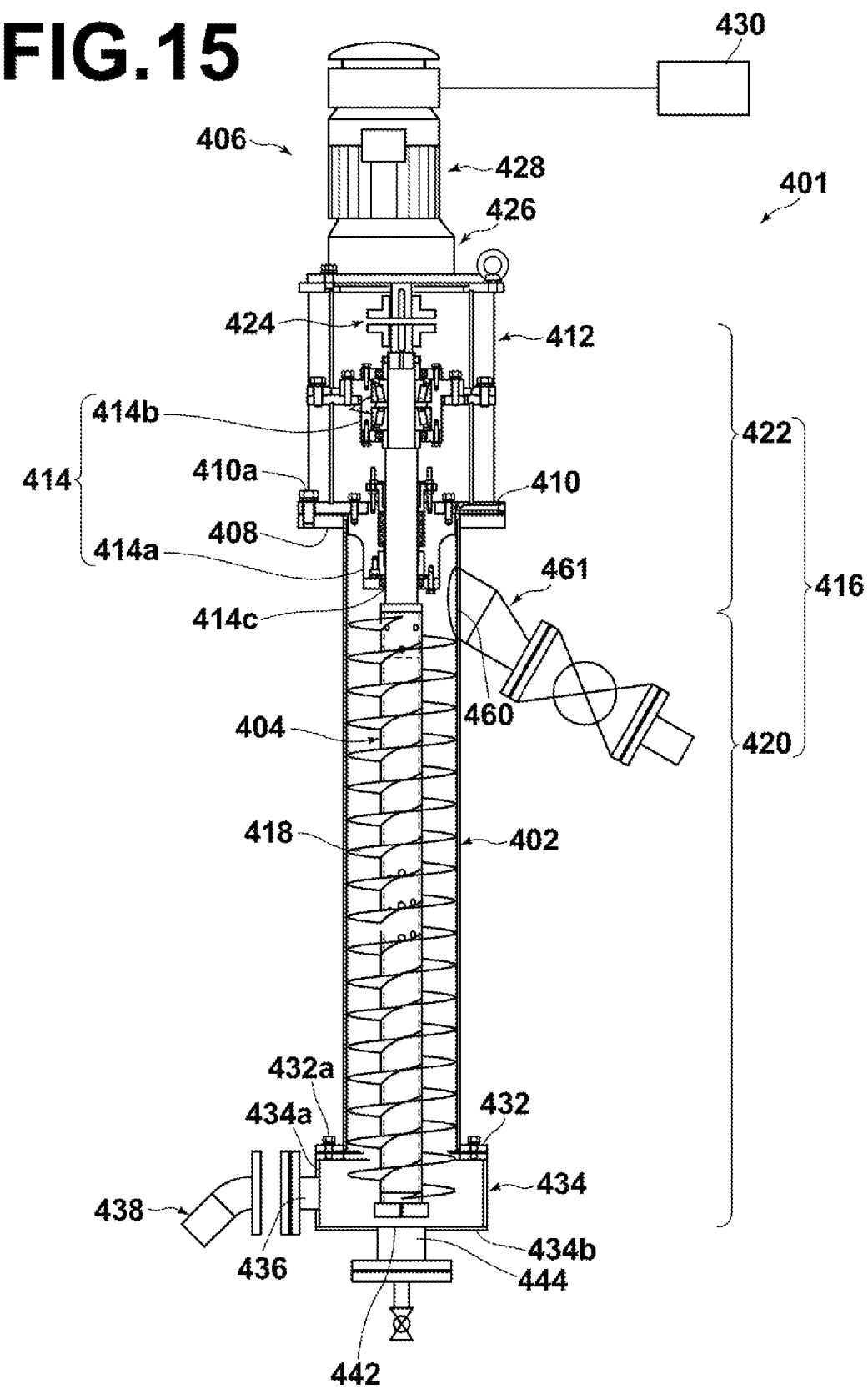
[FIG. 15] A schematic vertical sectional view that illustrates a conventional externally mounted filtration media cleansing apparatus.

Next, a third application of a cleansing apparatus 1c according to a still further alternate embodiment of the present invention will be described with reference to FIG. 14. Note that the control section 30 is omitted from FIG. 14. In addition, a screw conveyor 4X is of the same shape as the screw conveyor 4' of FIG. 9. This application is a case in which the cleansing apparatus is installed at a lower position, to improve the operability of the cleansing apparatus, which is generally installed at a position higher than that of a filtration tank. A filtration tank 301 of a filtration apparatus 300 which is utilized here is substantially the same as the filtration tank 101 utilized in the first application, with slight changes. That is, the filtration tank 301 is configured such that an introducing pipe 38c is mounted at a side surface thereof. The cleansing apparatus 1c itself is installed at a low position close to floor 3. The introducing pipe 38c connects the side surface of the filtration tank 301 and the lower end portion of the cleansing apparatus 1c, and extends obliquely downward from the side surface to the lower end portion. An expelling pipe 61c is provided to face downward from the upper portion of an outer cylinder 2X of the cleansing apparatus 1c. The backwash liquid 122 that includes cleansed filtration media expelled from the expelling pipe 61c is stored in a filtration media reservoir tank. A filtration media pump 82 is installed in the filtration media reservoir tank 80. The stored filtration media are expelled into a manhole 318 of the filtration tank 301 via a hose 84 that functions as an expelling pipe by the filtration media pump 82 (sand pump). In other words, in the third application, the filtration media are expelled from the expelling pipe 61c by pumping force applied by the filtration media pump 82. The advantage of this application is that operability is improved, because all operations can be performed at low positions.

Note that the above embodiments and applications were described as cases in which the cleansing apparatuses cleanse filtration sand. However, the target of cleansing is not limited to sand, and may be filtration media such as smokeless coal (anthracite), activated carbon, and the like, or combinations of such filtration media. In addition, water was described as the liquid to be filtered. However, other liquids, such as oil, may be the liquid to be filtered.

In the third application, the pump was provided along the path of the expelling pipe 61c. Pumps for suctioning the filtration media 112a may also be provided along the paths of the introducing pipes 38, 38a, and 38b.

In addition, a plurality of filtration media cleansing apparatuses equipped with the regulating blade of the present invention may be mounted on a single filtration apparatus, as described in Japanese Patent Application No. 2009-296872.

Further, the regulating blade of the present invention may be applied to a filtration media cleansing apparatus that continuously cleanses filtration media, such as that disclosed in Japanese Patent No. 3693532.

A filtration media cleansing apparatus that continuously cleanses filtration media repeatedly and continuously performs the steps of scrubbing filtration media introduced from the exterior with a screw conveyor and expelling the scrubbed filtration media to the exterior. By providing the regulating blade in the vicinity of the outlet of the filtration media cleansing apparatus, the advantageous effect that filtration media can be smoothly expelled to the exterior can be obtained in an enhanced manner. Therefore, not only will the durability of the filtration media cleansing apparatus be improved, but the processing capability of the filtration media cleansing apparatus will be improved as well.

The externally mounted filtration media cleansing apparatus of the present invention can be added to existing filtration tanks and utilized.

The invention claimed is:

1. A filtration media cleansing apparatus that cleanses filtration media for purifying liquids, comprising:
   an upright outer cylinder having an inlet through which the filtration media are introduced into an interior of the outer cylinder and an outlet for expelling the filtration media to an exterior of the outer cylinder after cleansing is complete;
   a screw conveyor provided within the outer cylinder so as to be rotatable, equipped with a spiral blade for conveying the filtration media introduced through the inlet upward while scrubbing the filtration media;
   a drive section that rotationally drives the screw conveyor; and
   a control section that controls the rotation of the drive section; wherein,
   the screw conveyor having a regulating blade that regulates upward movement of the filtration media, provided above the spiral blade coaxially with the screw conveyor and about the periphery of a central shaft thereof; and
   the outlet being provided to expel the filtration media which are conveyed from a space between the spiral blade and the regulating blade of the screw conveyor,
   wherein the outer cylinder is equipped with a cleansing liquid introducing aperture above at least the regulating blade within the outer cylinder.

2. The apparatus of claim 1, wherein,
   a permeation aperture, through which cleansing liquid which is introduced through the cleansing liquid introducing aperture, being formed in the regulating blade.

3. The apparatus of claim 1, wherein,
   the regulating blade being a blade being formed as a spiral blade having a spiral in a direction opposite that of the spiral blade.

4. The apparatus of claim 3, wherein,
   the pitch of the spiral of the regulating blade being smaller than the pitch of the spiral of the spiral blade.

5. The apparatus of claim 1, wherein,
   the regulating blade being formed in a planar shape.

6. The apparatus of claim 5, wherein,
   a planar blade that extends in a direction perpendicular to the plane of the regulating blade and having a surface that faces a rotating direction of the regulating blade being provided on an upper and/or lower surface of the regulating blade.

7. The apparatus of claim 1, wherein,
   the regulating blade being formed in the shape of an umbrella that opens in the downward direction.

8. The apparatus of claim, 7, wherein,
   a planar blade that extends in a direction perpendicular to the plane of the regulating blade and having a surface that faces a rotating direction of the regulating blade being provided on an upper and/or lower surface of the regulating blade.

9. A combination of a filtration apparatus and a filtration media cleansing apparatus that cleanses filtration media from the filtration apparatus, the combination comprises:
   (1) a filtration media cleaning apparatus comprising:
   an upright outer cylinder having an inlet through which the filtration media are introduced into an interior of the outer cylinder and an outlet for expelling the filtration media to an exterior of the outer cylinder after cleansing is complete;
   a screw conveyor provided within the outer cylinder so as to be rotatable, equipped with a spiral blade for conveying the filtration media introduced through the inlet upward while scrubbing the filtration media;
   a drive section that rotationally drives the screw conveyor; and
   a control section that controls the rotation of the drive section; wherein,
   the screw conveyor having a regulating blade that regulates upward movement of the filtration media, provided above the spiral blade coaxially with the screw conveyor and about the periphery of a central shaft thereof; and
   the outlet being provided to expel the filtration media which are conveyed from a space between the spiral blade and the regulating blade of the screw conveyor;
   (2) a filtration apparatus, wherein the filtration media cleansing apparatus is externally mounted to the filtration apparatus, and the filtration apparatus is equipped with a filtration tank having a layer of the filtration media in the interior thereof that filters supplied liquid with the layer of filtration media, and discharges filtered liquid to the exterior of the filtration tank; and
   (3) pipes for connecting the inlet and the outlet of the outer cylinder with the filtration tank.

* * * * *